UNITED STATES PATENT OFFICE.

HERMAN SCHLUNDT, OF COLUMBIA, MISSOURI.

CONCENTRATING CARNOTITE ORES.

1,240,607.  Specification of Letters Patent.  Patented Sept. 18, 1917.

No Drawing.  Application filed June 16, 1916. Serial No. 103,939.

*To all whom it may concern:*

Be it known that I, HERMAN SCHLUNDT, a citizen of the United States, residing at Columbia, county of Boone, State of Missouri, have invented certain new and useful Improvements in Concentrating Carnotite Ores; and I do hereby declare the following to be a full, clear, and exact description of the invention, such as will enable others skilled in the art to which it appertains to make and use the same.

My invention relates to the concentration of carnotite and other ores and radium-containing materials and to the production therefrom of concentrates of relatively high radium content.

In my Patent No. 1,181,411, issued May 2, 1916, I have described and claimed a method of effecting a selective extraction of radium from carnotite ores and concentrates and other suitable radium-containing material according to which the material is treated with concentrated sulfuric acid to dissolve out the radium-barium components as sulfates, and the radium-barium sulfates subsequently recovered, as by precipitation with water. The present invention, in some respects, constitutes an improvement upon the method of said prior application, more particularly in the character of the solvent used. Instead of using sulfuric acid, as disclosed in said patent, concentrated solutions of niter cake, or acid sodium sulfate, obtained as a by-product in the manufacture of nitric acid from sodium nitrate, may be used. Instead of using solutions of niter cake, solid niter cake can be used and heated to a suitable temperature to melt the cake and cause the desired solution of the radium therein.

According to the present invention, in its preferred embodiment, the carnotite ores are treated with the niter cake in solution or in a fused condition by a procedure in which the radium-barium sulfates are ultimately precipitated in admixture with the undissolved material and are separated from the sand and other insoluble gangue constituents by differential sedimentation.

Various features of novelty are hereinafter pointed out and other advantages of the present invention will more clearly appear from the following detailed description.

I have found that the radium in carnotite ores and certain other radium containing material, such as samarskite, can be greatly concentrated by treatment of the ore in a wet way with a solution of niter cake under such conditions of concentration and temperature that it will dissolve the radium together with barium as sulfates, then by precipitating the dissolved sulfates in admixture with the undissolved material, as by dilution with water and by subjecting the resulting product containing the precipitated sulfates to a differential sedimentation, sulfates are obtained in the form of a concentrate of relatively high radium content. But, in accordance with a modified procedure, the niter cake may be in a molten condition and not in solution, except to the extent of the relatively small amount of moisture normally carried by the niter cake. Whether the solvent of the radium and barium as sulfates be a hot solution of salt cake or molten niter cake, the radium together with the barium can be dissolved as sulfates and thereby extracted from the main body of the ore. By then diluting the concentrated solution with water, the dissolved radium-barium sulfates can be precipitated practically completely in a fine state of division. If this precipitation is effected according to the procedure preferred by me, it will be done while the solution is still in contact with the sand and undissolved gangue, and the precipitated radium-barium sulfates will be separated from the gangue by differential sedimentation.

The powdered carnotite ore ground or pulverized to pass through a ten or twenty mesh sieve is digested with a concentrated solution of niter cake. By continued boiling of the ore with this solution until a temperature of about 200° C., or above, is reached, a satisfactory extraction of the radium and barium compounds as sulfates can be effected. The gangue constituents of carnotite ores consist principally of sand, so that the mixture resulting from the digestion contains the radium-barium sulfate in solution, and thereby physically separated from the sand. When allowed to cool the mixture is generally solid.

The digestion with the concentrated niter cake solution accordingly results in a selective extraction of the radium and barium compounds of the ore as sulfates, together with more or less other constituents of the ore which are dissolved under the particular conditions of treatment. The uranium and vanadium compounds of the ore are converted into water soluble products. The greater part of the ore—the sands (silica or silicates)—is not materially acted upon by the hot niter cake solution unless the digestion and boiling is quite prolonged.

The ore-acid mass is next treated with water, preferably without filtering off the acid solution from the main body of the ore. To promote interaction and solution, it has been found particularly advantageous to add the ore-acid mass, while still hot, to the water, preferably hot water, with stirring and agitation. The addition of water causes precipitation of the radium-barium sulfates in a very finely divided form, while most of the uranium and vanadium compounds, and more or less of the other water soluble compounds pass into solution. The sands and silicates of the ore are for the most part relatively coarse grained and settle quite rapidly when agitation of the liquor ceases, while the finer particles, including the radium-barium sulfates, because of their fine state of division, settle relatively slowly and remain for some time in suspension above the sands which more rapidly settle out. In fact within a short period of time after the agitation of the solution has ceased, a distinct boundary appears between the sandy sediment and the supernatent liquid and suspension.

The liquid with suspended matter is now run off and the radium-barium sulfates in suspension above the sediment are thereby separated from the sediment. This differential sedimentation by agitation of the liquid and by subsequently permitting the heavier particles of sand to settle, etc., can be effected in various types of agitators, and many of the mechanical devices used in the wet concentration of ores are available for this purpose when constructed of suitable acid-resistant material.

In order to complete the removal of the finely divided material still remaining in the sands after the first treatment with water, the sands can with advantage be given several additional washings, preferably with water containing a trace of barium salt, and the differential sedimentation repeated as many times as may be necessary. The washing with water and the removal of the water after a short period of differential sedimentation is usually repeated until the original deep blue color of the solution disappears step by step in the wash liquids. The washed sands constituting the tailings in this process are practically free from radium, rarely containing more than five per cent. of the radium content of low grade ores.

The several wash liquids are united and well stirred to permit solution of the sparingly soluble calcium sulfate where this compound is present. The combined liquids and suspended matter are then allowed to stand for a suitable period of time which may vary from one to three or four days to complete the precipitation of the radium-barium sulfates. The sediment or sludge thus obtained, when dried, constitutes the radium concentrate.

The total quantity of water used will vary somewhat with the nature of the ore, but in practice the volume of water is generally at least ten times that of the solution used in the treatment of the ore. A somewhat more complete recovery of radium is obtained where the water used contains in solution a small quantity of some soluble barium salt. The presence of barium salts in the water prevents the radium-barium sulfates from redissolving in part, as might be the case with water free from barium salts and hence capable of dissolving some small amounts of barium sulfate. The presence of barium sulfate in the water prevents the precipitated radium-barium sulfates from being redissolved. Most carnotite ores contain sufficient barium compounds for the precipitation of radium, but where the ores are deficient in barium compounds, further amounts of barium salts can with advantage be added to increase the barium sulfate which carries down the radium sulfate.

In order that the sand and gangue constituents of the ore may not be in a too finely divided form which might interfere with the extraction of the ore and the subsequent differential sedimentation, the ore should not be crushed finer than is necessary to break up the ore particles and expose the carnotite containing the radium. With sand-stone ores, such as the usual carnotite ores, in which the carnotite for the most part is formed on the outside of the sand-stone granules, crushing to ten or twenty mesh will usually be sufficient and will result in the production of an ore body which lends itself readily to extraction and differential sedimentation according to the present invention.

Whatever the concentration of the aqueous solution of niter cake with which the digestion is started, and whatever the initial temperature, the treatment should be continued, to get a high extraction, until the temperature reaches 200° C., or higher, and at this temperature and corresponding concentration, there should be present enough of the solvent to adequately wet and thereby reach all parts of the ore under treatment.

Small amounts of other acid material, such as hydrochloric acid or nitric acid or sulfurous acid, may be added to the salt cake solution and may be present during the process without materially impairing the process, and in some instances even with improved results.

Instead of using a solution of niter cake the solid niter cake can be melted and used in molten condition as the solvent for the radium in the ore. The digestion of the ore with niter cake for the purpose of dissolving the radium and barium as sulfates is finally conducted to a temperature of 360° C., or higher, and the digestion is continued for half an hour, or more, and preferably for as much as an hour. If the mixture of niter cake and ore is allowed to cool, it becomes solid and is then difficult to break up and get into solution. I have found, however, that by suitably pouring the hot viscous liquid into water, preferably hot water, and stirring vigorously, the soluble portions of the ore pass into solution readily and the radium-barium sulfates are precipitated and can be separated with other suspensoids from the coarse sands in the manner indicated above. Extraction as high as 95% can be obtained.

In adding the concentrated niter cake solution or the molten cake solution to the water as distinguished from first cooling and then stirring the solid or thick pasty mass into water, the breaking up of the mass and the extraction of the soluble constituents with accompanying precipitation of the radium-barium sulfates can be effected in a particularly advantageous manner.

Instead of precipitating all of the dissolved radium-barium sulfates in admixture with the undissolved material, part of the solution of the sulfates can under some circumstances be separated, as by filtration, before precipitation, and the remainder precipitated by dilution with water in admixture with the undissolved residue and subsequently recovered by a differential sedimentation. The present invention accordingly enables the remaining portions of the dissolved radium-barium sulfates to be recovered from admixture with the insoluble residue after part of the dissolved radium-barium sulfates have been otherwise separated, e. g., by filtration.

The further concentration of the radium in the concentrates obtained by the process of the present invention can be conducted by selective extraction with an excess of sulfuric acid and precipitation of the radium-barium sulfates from the acid solution, separated from the insoluble residue, by simple dilution with water as described and claimed in my Patent No. 1,181,411. The concentrates can furthermore be further concentrated by fusion methods or by other suitable methods of concentrates familiar to those skilled in the art.

I claim:

1. The method of effecting extraction of radium from carnotite ores and concentrates and other suitable radium-containing material, which comprises treating the material with niter cake of a concentration and at a temperature sufficient to convert the radium-barium components into sulfates in solution, and recovering the radium sulfate from the solution thus formed.

2. The method of effecting selective extraction of radium from carnotite ores and concentrates and other suitable radium-containing material, which comprises treating the material with a concentrated solution of niter cake and at a temperature to dissolve the radium-barium contents and recovering the radium sulfate from the solution thus formed.

3. The method of extracting radium from carnotite ores and concentrates and other suitable radium-containing material, which comprises treating the material with niter cake of a concentration and at a temperature to dissolve the radium-barium components and precipitating the radium sulfate together with barium sulfate from the solution by dilution with water.

4. The method of effecting extraction of radium from carnotite ores and concentrates and other suitable radium-containing material, which comprises treating the material with niter cake of a concentration and at a temperature to dissolve the radium-barium components, precipitating the radium-barium sulfates into the undissolved material and subsequently recovering from the mixture the sulfates so precipitated.

5. The method of producing radium concentrates from carnotite ores and other suitable radium-containing material, which comprises treating the material with niter cake of a concentration and at a temperature sufficient to dissolve the radium together with barium as sulfates, diluting the solution with water and thereby precipitating the radium-barium sulfates in a finely divided condition in admixture with the undissolved material, and separating the finely divided sulfates from the undissolved material.

6. The method of producing radium concentrates from carnotite ores and other suitable radium-containing material, which comprises treating the material with niter cake at a temperature sufficient to dissolve the radium together with barium as sulfates, diluting the solution with water and thereby precipitating the radium-barium sulfates in a finely divided condition in admixture with the undissolved material and separating the finely divided radium-barium sulfates from the undissolved material.

7. The method of producing radium concentrates from carnotite ores and other suitable radium-containing material, which comprises treating the material with niter cake of a concentration and at a temperature sufficient to dissolve the radium together with barium as sulfates, pouring the resultant solution while in liquid condition into water and thereby diluting the solution and precipitating the radium-barium sulfates in a finely divided condition in admixture with the undissolved material, and separating the finely divided radium-barium sulfates from the undissolved material by differential sedimentation.

8. The method of producing radium concentrates from carnotite ores and other suitable radium-containing material, which comprises treating the material with niter cake at a temperature sufficient to dissolve the radium together with barium as sulfates, pouring the resultant solution while in a liquid condition into water and thereby diluting the solution and precipitating the radium-barium sulfates in a finely divided condition in admixture with the undissolved material and separating the finely divided radium-barium sulfates from the undissolved material.

In testimony whereof I affix my signature.

HERMAN SCHLUNDT.